July 21, 1959     O. W. HEISE     2,895,334

PRESSURE GAGE

Filed March 19, 1956

*INVENTOR.*
OTTO W. HEISE

BY

*ATTORNEY*

United States Patent Office 2,895,334
Patented July 21, 1959

2,895,334
PRESSURE GAGE
Otto W. Heise, Newtown, Conn.
Application March 19, 1956, Serial No. 572,381
9 Claims. (Cl. 73—388)

This invention relates to gages, and particularly to a new and improved pressure gage capable of accurately measuring fluid pressures over a wider range than heretofore possible.

The principal object of this invention is to provide a fluid pressure gage capable of accurately measuring pressures in excess of 100,000 p.s.i.

Other objects of the invention include the provision of such a gage in which a minimum of hysteresis or rap will be present; the provision of such a gage in which a readily deformable tube is backed up by a restraining means, and in which the deflection of the restraining means is employed to measure the pressure within the tube; and the provision of such a gage in which a weakened portion of a pressure tube is restrained from deflecting by a clamping member of sufficient cross-section to prevent deflection of the weakened portion beyond the elastic limit.

The above, other objects and novel features will become apparent from the following specifications and accompanying drawing in which.

Figure 1:
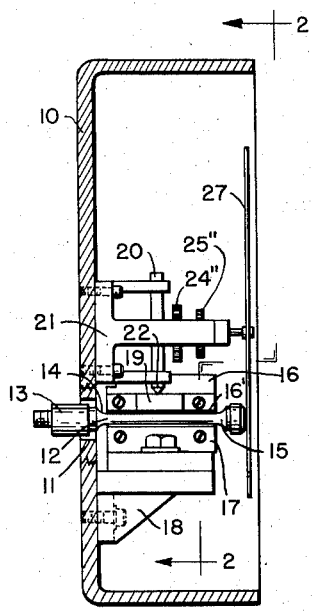
Figure 1 is a sectional view through a gage to which the principles of the invention have been applied.

Referring to the drawings and particularly to Fig. 1, a housing 10 is provided with an opening 11 in its back wall, through which a pressure tube 12 is adapted to extend. A connector 13 is attached to the outer end of tube 12 for receiving the line containing the pressure to be measured.

While the tube 12 may be curved in the manner of the well-known Bourdon tube, it is shown in the drawing and will be described as straight. It includes a cross-sectional shape for a substantial portion of its length, having semi-cylindrical side walls joined by top and bottom walls. While the top and bottom walls may follow any of the curves of the various cross-sections of known Bourdon tubes such as elliptical, they are shown in the embodiment disclosed as being straight and parallel. It is a well-known fact that the bursting strength of a cylindrical section far exceeds that of a section including the surfaces forming the top and bottom walls. Consequently, a greater deflection occurs in the latter than in the former for a given pressure within the tube.

The tube 12 includes cylindrical portions 14 and 15 at the extremities of the portion of non-circular cross-section. The wall thickness of the tube 12 is calculated to prevent the metal within the cylindrical portions thereof as well as that of the substantially semi-cylindrical portions from exceeding the elastic limit when the tube 12 is subjected to the maximum pressure desired to be measured by the gage. Of course, such a maximum pressure would cause the metal along the top and bottom walls of the tube to exceed the elastic limit unless provision is made to prevent such strain.

In the present invention this has been accomplished by providing a strain-restraining means along the entire top and bottom walls of the tube 12 and in the present embodiment this means takes the form of a C-spring 16.

The spring 16 has a cross-sectional construction and is made from a spring steel sufficiently strong to permit a deflection only of a predetermined amount when the tube 12 is subjected to a maximum internal pressure. The C-spring 16 has a longitudinal slot 16' of a length equal to the length of the top and bottom walls of the tube 12 between the cylindrical portions 14 and 15. The thickness of the wall of the C-spring 16 is such that the transverse dimension of the slot 16' is equal to the transverse dimension of the top and bottom walls of the tube 12. Should the top and bottom walls be elliptical, then the transverse surfaces of the slot 16' will also be elliptical to conform to the elliptical top and bottom walls. However, in the embodiment disclosed, the top and bottom walls of the tube 12 between the cylindrical portions 14 and 15 are flat and parallel. With the transverse surfaces of the slot 16' conforming to the contour of the top and bottom surfaces of the tube 12, a construction is provided which leaves exposed only the cylindrical portions 14, 15 and the semi-cylindrical portions between the top and bottom walls of the tube 12.

The portion of the C-spring 16 below the longitudinal slot 16' is rigidly attached to an angle plate 17 which latter is fixed to a bracket 18 by a screw passing through an elongated hole 18'. The bracket 18 is secured to the back wall of the housing 10. An arm 19 is fixed to the portion of C-spring 16 above the longitudinal slot 16'. While any form of mechanical, electrical or electronic means may be employed for measuring the deflection of the C-spring 16, a mechanical gear train has been shown and it includes a plunger 20 mounted in a bracket 21 fixed to the back of housing 10. The plunger 20 is provided with a ball or nosed end 22 that rests on the lever 19. The plunger 20 is provided with rack teeth 23 that mesh with a pinion 24 fixed to a rotatable shaft 24' supported by bracket 21. A gear 24" is fixed also to shaft 24' and it meshes with a gear 25 fixed to a shaft 25' rotatably mounted in bracket 21 and in spaced parallel relation with shaft 24'. Another gear 25" that is fixed to shaft 25' meshes with a pinion 26 on an axis at the center of the housing 10. A pointer hand 27 is fixed to the shaft supporting pinion 26.

From the foregoing it is evident that an increasing pressure within tube 12 will separate the walls defining the slot 16' of the C-spring 16 thereby moving lever 19 relatively to plate 17. Since the ball end 22 is out near the free end of lever 19, the movement of the walls of the slot 16' will be substantially multiplied and such multiplied motion will be transferred to pointer 27 through the rack 23 and gears 24, 24", 25, 25" and 26.

The degree of multiplication of movement of the walls of the slot 16' can be varied by providing relative movement between the plunger 20 and the lever 19 to vary the effective length of lever 19. Although the bracket 21 can be adjustably located so as to accomplish this result, in the present embodiment it may be done by shifting the angle plate 17 through the agency of the elongated slot 18'.

Figure 2:
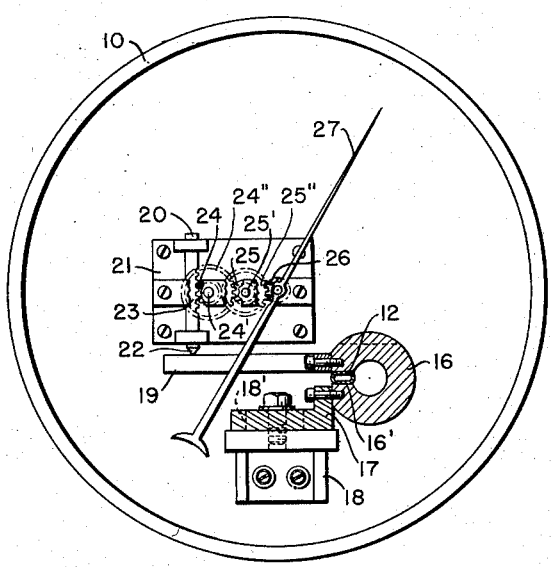
Fig. 2 is a sectional view taken substantially along line 2—2 of Fig. 1.
Figure 4:
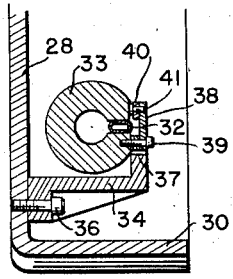
Fig. 4 is a section taken substantially along line 4—4 of Fig. 3.
Figure 3:
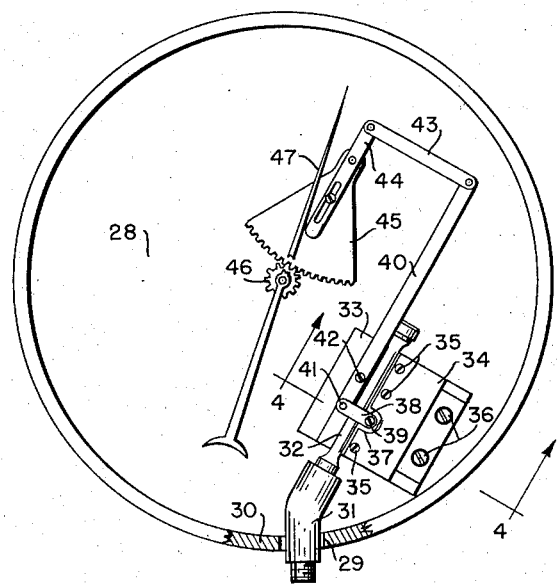
Fig. 3 is a view of a gage similar to that shown in Figs. 1 and 2 but embodying a modified form of the invention.

Referring to Figs. 3 and 4, a modified form of the invention is shown. A housing 28 generally similar to housing 10 is provided with an opening 29 in its peripheral wall 30. An inlet fitting 31 is mounted in the opening 29 and is connected to a straight tubular element 32 similar to tube 12 of Figs. 1 and 2. A C-spring 33 similar to C-spring 16 is fixed to an angular bracket 34 by three screws 35. The bracket 34 is recessed at 37 so that a link 38 can have its one end fixed to the C-spring 33 at a point below the slot thereof by a screw 39. The end of the link 38 opposite to that fixed to C-spring 33 is freely connected to one end of a multiplying link 40 by a pin 41. The link 40 is relatively long and of a very rigid cross-sectional construction to prevent deflection. It is made from as light weight a material as is consistent with the above requirements. The link 40 is pivoted to the C-spring 33 at a point 42 above the longitudinal slot thereof. The end of link 40 opposite that connected to link 38 is pivotally connected to a connecting link 43, which latter is connected to the conventional segment slide 44 and rack segment 45. The rack mechanism 45 meshes with a pinion 46 on a shaft located at the center of the housing 28. A pointer 47 is driven by the gear 46 in the usual manner.

From the foregoing it is evident that increasing pressure within the tube 32 will cause separation of the walls of the slot in C-spring 33. This separation will be amplified by the linkage 38 and 40. The amplified motion will be transmitted to the pointer 47 through the segment 45 and pinion 46.

Although the various features of the new and improved gage have been shown and described to disclose two embodiments of the invention, it will be evident that certain features may be used without others without departing from the principles of the invention.

What is claimed is:

1. In a pressure gage, a tube having a substantial portion of its length of non-cylindrical cross-section and including top and bottom walls joined by substantially semi-cylindrical side walls; means for closing one end of said tube; means for connecting a source of pressure fluid to the other end of said tube; means separate from said tube for restraining the deflection of the entire top and bottom walls of said tube within said substantial portion of its length; and multiplying means responsive to the deflection of said restraining means for operating an indicator.

2. In a pressure gage, a straight tube having a substantial portion of its length of non-cylindrical cross-section and including top and bottom walls joined by semi-cylindrical side walls; means for closing one end of said tube; means for connecting a source of pressure fluid to the other end of said tube; means separate from said tube for restraining the deflection of the entire top and bottom walls of said tube within said substantial portion of its length; and multiplying means responsive to the deflection of said restraining means for operating an indicator.

3. In a pressure gage, a tube having a non-circular cross-section for a substantial portion of its length and including top and bottom walls joined by substantially semi-cylindrical walls, the thickness of which walls is such that the substantially semi-cylindrical portions thereof remain safely within the elastic limit of the material employed for the tube when the latter is subjected to a desired maximum internal pressure; means separate from the tube for restraining the deflection of the top and bottom walls of said tube to an amount safely within the elastic limit of the material of the tube; and multiplying means responsive to the deflection of said restraining means for operating the indicator of the gage.

4. In a pressure gage, a straight tube having a non-circular cross-section for a substantial portion of its length and including top and bottom walls joined by substantially semi-cylindrical walls, the thickness of which walls is such that the substantially semi-cylindrical portions thereof remain safely within the elastic limit of the material employed for the tube when the latter is subjected to a desired maximum internal pressure; means separate from the tube for restraining the deflection of the top and bottom walls of said tube to an amount safely within the elastic limit of the material of the tube; and multiplying means responsive to the deflection of said restraining means for operating the indicator of the gage.

5. A pressure gage comprising in combination, a housing; a bracket attached to said housing; a C-spring having a longitudinal slot therein; a connection between said C-spring on one side of said slot and said bracket; an arm fixed to said C-spring on the other side of said slot; a tube having top and bottom walls in contact with and conforming in contour to the walls of the C-spring defining said longitudinal slot thereof; means for closing one end of said tube; means for admitting pressure fluid to the opposite end of said tube; and means for transmitting the movement of the walls of the C-spring forming said slot to an indicator of the gage.

6. A pressure gage comprising in combination, a housing; a tube having top and bottom walls joined by substantially semi-cylindrical wall portions, the thickness of which walls is such that the substantially semi-cylindrical portions thereof remain safely within the elastic limit of the material of the tube when the latter is subjected to a desired maximum internal pressure; a C-spring having a cross-sectional construction such that the walls thereof defining the slot therein conform to and cover the entire area of the top and bottom walls of said tube; a bracket fixed to said housing; means for fixing said C-spring to said bracket; and means responsive to the deflection of the walls of the C-spring defining said slot for operating an indicator of the gage.

7. A pressure gage comprising in combination, a housing; a bracket attached to said housing; a C-spring having a longitudinal slot therein; a connection between said C-spring on one side of said slot and said bracket; an arm fixed to said C-spring on the other side of said slot; a tube having top and bottom walls in contact with and conforming in contour to the walls of the C-spring defining said longitudinal slot thereof; means for closing one end of said tube; means for admitting pressure fluid to the opposite end of said tube; a reciprocable rack member having a ball end in contact with said arm; a pointer for said gage; and a gear train between said rack member and said pointer.

8. A pressure gage comprising in combination, a housing; a bracket attached to said housing; a C-spring having a longitudinal slot therein; a connection between said C-spring on one side of said slot and said bracket; an arm fixed to said C-spring on the other side of said slot; a tube having top and bottom walls in contact with and coforming in contour to the walls of the C-spring defining said longitudinal slot thereof; means for closing one end of said tube; means for admitting pressure fluid to the opposite end of said tube; a reciprocable rack member having a ball end in contact with said arm; means for providing relative movement between said arm and rack member to vary the effective length of said arm; a pointer for said gage; and a gear train between said rack member and said pointer.

9. A pressure gage comprising in combination, a housing; a bracket attached to said housing; a C-spring having a longitudinal slot therein; a connection between said C-spring on one side of said slot and said bracket; a multiplying lever of extreme rigidity and minimum weight pivoted to said C-spring on the other side of said slot and having a short arm and a long arm; a tube having top and bottom walls in contact with and conforming in contour to the walls of the C-spring defining said longitudinal slot thereof; means for closing one end of said tube; a link having its one end connected to the connection between the C-spring on the said one side of said slot and said bracket, and its other end freely pivoted to the end of the shorter arm of said pivotally-mounted multiplying lever; a pointer for said gage; and means between the end of the longer arm of said pivotally-mounted multiplying lever and said pointer for transferring the multiplied motion of the slot in the C-spring to said pointer.

References Cited in the file of this patent

UNITED STATES PATENTS

| 1,861,999 | Bowlus | June 7, 1932 |
| 2,722,881 | Sutterfield | Nov. 8, 1955 |

FOREIGN PATENTS

| 322,511 | Great Britain | Dec. 3, 1929 |